(12) United States Patent
Zhao

(10) Patent No.: US 12,208,606 B2
(45) Date of Patent: Jan. 28, 2025

(54) MEMORY IRONING-FREE FOLDABLE COMPOSITE MATERIAL SUITABLE FOR APPARELS, MANUFACTURING METHOD THEREOF AND APPLICATION THEREOF

(71) Applicant: Yong Zhao, Guangzhou (CN)

(72) Inventor: Yong Zhao, Guangzhou (CN)

( * ) Notice: Subject to any disclaimer, the term of this patent is extended or adjusted under 35 U.S.C. 154(b) by 707 days.

(21) Appl. No.: 17/472,728

(22) Filed: Sep. 13, 2021

(65) Prior Publication Data

US 2022/0288890 A1    Sep. 15, 2022

(30) Foreign Application Priority Data

Mar. 12, 2021   (CN) .......................... 202110270973.7

(51) Int. Cl.
*B32B 9/04* (2006.01)
*A41D 31/04* (2019.01)
(Continued)

(52) U.S. Cl.
CPC .............. *B32B 9/047* (2013.01); *A41D 31/04* (2019.02); *B32B 5/022* (2013.01); *B32B 7/06* (2013.01); *B32B 7/09* (2019.01); *B32B 7/12* (2013.01); *B32B 9/06* (2013.01); *B32B 37/10* (2013.01); *B32B 37/1284* (2013.01);
(Continued)

(58) Field of Classification Search
CPC ..... Y10T 428/31663; B32B 9/00; B32B 9/04; B32B 9/045; B32B 9/047; B32B 2437/00; B32B 2437/02; A41D 1/00; A41D 1/02; A41D 3/00; A41D 3/02; A41D 27/00; A41D 27/02; A41D 31/00; A41D 31/02; A41D 31/04; A41D 2300/00; A41D 2400/00; A41D 2400/42

USPC ...... 428/446, 447, 448; 2/69, 85, 93, 95, 97, 2/113, 115, 243.1, 272

See application file for complete search history.

(56) References Cited

FOREIGN PATENT DOCUMENTS

| CN | 203945740 U | * 11/2014 |
| CN | 104975536 A | * 10/2015 |

(Continued)

OTHER PUBLICATIONS

Machine translation (Espacenet) of CN 203945740 U. Translated May 18, 2024. (Year: 2024).*

(Continued)

*Primary Examiner* — Maria V Ewald
*Assistant Examiner* — Ethan A. Utt
(74) *Attorney, Agent, or Firm* — WPAT, PC

(57) ABSTRACT

A memory ironing-free foldable composite material suitable for apparels, a manufacturing method thereof and an application thereof are provided. The memory ironing-free foldable composite material may include at least seven layers of materials, a middle position adopts a silica gel layer, two sides of the silica gel layer are symmetrically provided with adhesion layers and substrate composite layers in turn, an outermost layer on one side is provided with a cover layer, and another outermost layer on the other side is provided with a lining layer. According to an apparel design scheme, a finished product of apparel can be formed by ordinary tailoring and sewing by machine. After repeated folding and washing, it can still maintain the shaping effect, would not foam and swell, would not peel off, can be rainproof and windproof, can have high humidity resistance, and thus can meet the needs of multi-scenarios and versatility.

3 Claims, 5 Drawing Sheets

(51) Int. Cl.
   *B32B 5/02*    (2006.01)
   *B32B 7/06*    (2019.01)
   *B32B 7/09*    (2019.01)
   *B32B 7/12*    (2006.01)
   *B32B 9/06*    (2006.01)
   *B32B 37/10*   (2006.01)
   *B32B 37/12*   (2006.01)

(52) U.S. Cl.
   CPC .. *A41D 2500/30* (2013.01); *B32B 2307/7265* (2013.01); *B32B 2307/744* (2013.01); *B32B 2437/00* (2013.01)

(56) References Cited

FOREIGN PATENT DOCUMENTS

| | | | | |
|---|---|---|---|---|
| CN | 108783648 A | * | 11/2018 | ........... A41D 13/002 |
| CN | 208857450 U | * | 5/2019 | ............ G01M 11/00 |

OTHER PUBLICATIONS

Machine translation (Espacenet) of CN 108783648 A. Translated May 18, 2024. (Year: 2024).*
Machine translation (Espacenet) of CN 208857450 U. Translated May 20, 2024. (Year: 2024).*
Machine translation (Espacenet) of CN 104975536 A. Translated Nov. 26, 2024. (Year: 2024).*

* cited by examiner

MEMORY IRONING-FREE FOLDABLE COMPOSITE MATERIAL SUITABLE FOR APPARELS, MANUFACTURING METHOD THEREOF AND APPLICATION THEREOF

FIELD OF THE DISCLOSURE

The disclosure relates to the field of new materials in apparel industry, and more particularly to a memory ironing-free foldable composite material suitable for apparels, a manufacturing method thereof, and an application thereof.

BACKGROUND OF THE DISCLOSURE

With a progress of times, new technologies, new materials and new processes have been more and more widely introduced into garment/apparel industry to thereby improve and enhance scenario applications. Traditional apparel fabrics basically only have general functions such as warmth preservation and decoration, which cannot meet people's ever-changing personalized pursuit. With the improvement of living standards, requirements for aesthetic performance of apparels are becoming higher and higher. In order to maintain aesthetic effect of apparels, most of apparels need to be shaped according to design schemes. Traditional apparels usually adopt lining materials with certain hardness for support and shaping, and the lining materials each are pasted between a fabric and a lining by means of heating a hot-melt adhesive, which is easy to foam and swell after being worn for a period of time or being washed, and even cause a large-area peeling off. Moreover, a rigid lining material makes the apparel be difficult to fold, large in volume, occupy more space, and inconvenient to carry, transport and store. In some scenes with poor environmental conditions, protections from rain, wind and high humidity are also required, which is inconvenient to wear and use.

Because the apparels in the related art are limited by the materials of the fabric and lining, and the need to maintain the shaping effect, it usually must be cleaned by dry cleaning or hand washing, and must be shaped at a high temperature through a professional ironing equipment, which takes a long time and high cost. Some high-end brands or high-end customized apparels are even limited by materials and shaping effects, so they cannot be cleaned and reused, resulting in a waste of resources.

Moreover, apparel products will form creases after folding, so they must be shaped and protected in a process of transportation, and the packaging needs to be supported by cartons/boxes, which would increase the cost of product packaging and transportation. It also needs to be packaged and used independently in storage and use, which would take up a large space and limit scenario applications.

The apparel materials in the related art only have characteristics of textile fabrics, do not have physical and chemical tolerance and stability, and thus cannot meet use requirements of multi-scenarios and versatility.

SUMMARY OF THE DISCLOSURE

In order to solve the above-mentioned problems existing in the related art, the disclosure aims to provide a memory ironing-free foldable composite material suitable for apparels, a manufacturing method thereof, and an application thereof, which can maintain a shaping effect after repeated folding and washing, would not foam and swell, would not peel off, can be rainproof and windproof, can have high humidity resistance, and thus can meet use requirements of multi-scenarios and versatility.

The technical solutions adopted by the disclosure may be as follows.

Specifically, a memory ironing-free foldable composite material suitable for apparels may include at least seven layers of materials, a fourth layer as a middle layer is a silica gel layer, a third layer and a fifth layer respectively adjacent to two opposite sides of the middle layer are adhesion layers, a second layer located outside the third layer is a substrate composite layer, a sixth layer located outside the fifth layer is another substrate composite layer, a first layer located outside the second layer is a cover layer, and a seventh layer located outside the sixth layer is a lining layer. The first layer, the second layer, the third layer, the fourth layer, the fifth layer, the sixth layer and the seventh layer are sequentially arranged in that order.

In an embodiment of the disclosure, the silica gel layer is one of a silica gel mesh, a silica gel sheet and a silica gel roll and made of $SiO_2 \cdot nH_2O$ material.

In an embodiment of the disclosure, the cover layer is a non-stick paper or an apparel fabric, and the non-stick paper is silicone oil release paper.

In an embodiment of the disclosure, each of the substrate composite layers is a polymer double-sided adhesive layer, or a combination material composed of the polymer double-sided adhesive layer and a substrate, and the substrate is a non-woven fabric.

In an embodiment of the disclosure, a material of each of the adhesion layers is a surface treatment agent for silica gel, and the surface treatment agent for silica gel is a combination material including a coupling agent.

In an embodiment of the disclosure, a material of the lining layer is a non-stick paper or an apparel lining, the non-stick paper is a silicone oil release paper, and the apparel lining is an oxford lining or a non-woven fabric.

In another embodiment of the disclosure, a memory ironing-free foldable composite material suitable for apparels, which may include at least four layers of materials. A fourth layer located at a bottom-most 1 position is a silica gel layer, a third layer located on the silica gel layer is an adhesion layer, a second layer located on the adhesion layer is a substrate composite layer, and a first layer located on the substrate composite layer is a cover layer. The fourth layer, the third layer, the second layer and the first layer are sequentially arranged in that order from bottom to top.

In further another embodiment of the disclosure, according to a manufacturing method of a memory ironing-free foldable composite material suitable for apparels, it may include the following steps:

step 1, performing roller-pressing for flattening and air-bubble removing on a roll-packed silica gel material or a sheet-packed silica gel material by using a roller-pressing composite mechanical equipment, an environment being required to be at a room temperature and dust-free during the flattening, and the material is flat and not curled after the flattening;

step 2, spraying a room temperature surface treatment adhesive agent on a surface of the roll-packed silica gel material or the sheet-packed silica gel material for five minutes for continuously and evenly;

step 3, coating a polymer double-sided adhesive layer evenly on an outer surface of the room temperature surface treatment adhesive agent by a roller-pressing method using a laminating machine or a spraying process using a spraying equipment, the silica gel material needs to be fixed during the coating to avoid wrinkle;

step 4, covering a layer of release paper on an outer surface of the polymer double-sided adhesive layer to obtain a single-sided composite silica gel material; and step 5, turning over the single-sided composite silica gel material prepared in the step 4 to make an uncomposited side of the single-sided composite silica gel material face upward, and repeating the step 1 through the step 4 to obtain a finished product of the memory ironing-free foldable composite material.

In an embodiment of the disclosure, the roller-pressing for flattening in the step 1 is performed at a temperature of 60~120° C.

In still another embodiment of the disclosure, according to an application of a memory ironing-free foldable composite material suitable for apparels in an apparel field, the memory ironing-free foldable composite material is applied between an apparel fabric and an apparel lining to obtain a multi-layer structure, and a finished product of apparel using/employing the multi-layer structure is formed by an ordinary tailoring and sewing by machine according to an apparel design scheme; or a surface of the memory ironing-free foldable composite material is directly covered with a layer of apparel fabric to obtain a multi-layer structure, and a finished product of apparel using the multi-layer structure is formed by an ordinary tailoring and sewing by machine according to an apparel design scheme.

Compared with the related art, the embodiments of the disclosure may mainly have the following beneficial effects.

The disclosure relates to a memory ironing-free foldable composite material suitable for apparels, a manufacturing method thereof, and an application thereof. The memory ironing-free foldable composite material may include at least seven layers of materials, a middle position adopts a silica gel layer, two sides are symmetrically provided with adhesion layers and substrate composite layers in turn, an outermost layer on one side is provided with a cover layer, and another outermost layer on the other side is provided with a lining layer. According to an apparel design scheme, a finished product of apparel can be formed by ordinary tailoring and sewing by machine. After repeated folding and washing, it can still maintain the shaping effect, would not foam and swell, would not peel off, can be rainproof and windproof, can have high humidity resistance, and thus can meet the needs of multi-scenarios and versatility. It can make apparel and bags folding and portable, fold in half without creases, keep appearance of fabric to be unchanged, washable without delamination, ironing-free, with memory function, easy to store, and the silica gel itself will be melt at 200~400° C., which can make the fabric have a better protective function and low logistics and transportation cost. After using the material, due to its soft and comfortable material characteristics, it can be applied to almost all materials and scenes. Moreover, the permeability of silica gel can be retained or improved to make the fabric be windproof, waterproof and radiation-proof. Further, more and more extensive development and application can be done to enrich people's material and cultural lives.

DETAILED DESCRIPTION OF EMBODIMENTS

The technical solution in specific embodiments of the disclosure will be clearly and completely described below in conjunction with the accompanying drawings in the specific embodiments of the disclosure. Apparently, the described embodiments are only part of embodiments of the disclosure, not all of the embodiments of the disclosure. Based on the embodiments of the disclosure, all other embodiments obtained by those skilled in the related art without creative work/effort belong to the protection scope of the disclosure.

Unless otherwise defined, all technical and scientific terms used herein have the same meanings as those generally understood by those skilled in the technical field of the disclosure. The terms used in the description of the disclosure herein are only for the purpose of describing specific embodiments and are not intended to limit the disclosure. The term "and/or" as used herein includes any and all combinations of one or more related listed items.

Moreover, terms "include", "comprise" or any other variation thereof are intended to cover non-exclusive inclusion, so that a process, method, article or equipment including a series of elements includes not only those elements, but also other elements not explicitly listed, or elements inherent in such process, method, article or equipment. Without further restrictions, elements defined by the statement "including a . . . " do not exclude the existence of other same elements in the process, method, article or equipment including the elements.

Embodiment 1

Figure 1:
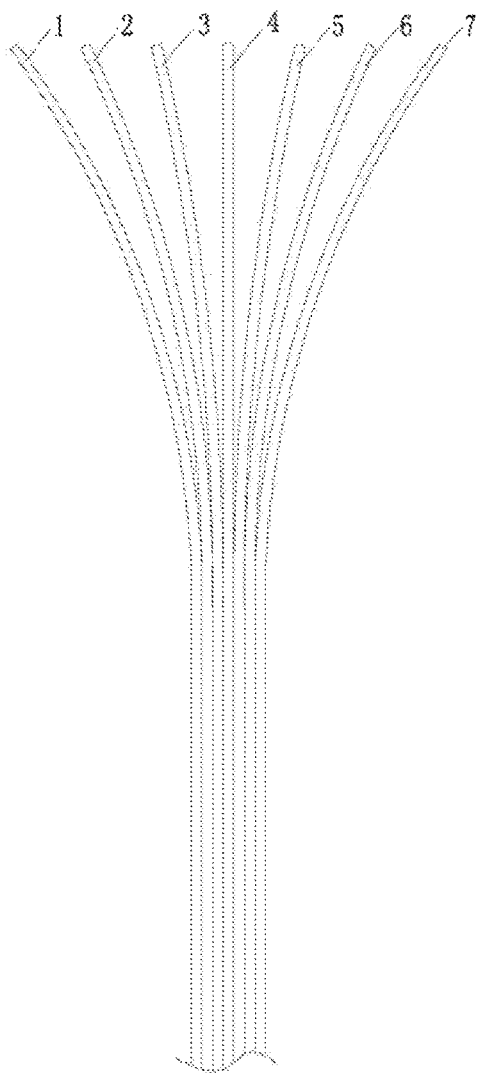
FIG. 1 is a schematic structural view of a memory ironing-free foldable composite material suitable for apparels according to embodiment 1 of the disclosure.

As shown in FIG. 1, a memory ironing-free foldable composite material suitable for apparels of the embodiment of the disclosure may include seven layers of materials, in which a fourth layer 4 as a middle layer is a silica gel layer, a third layer 3 and a fifth layer 5 respectively adjacent to two opposite sides of the middle layer are adhesion layers, and a second layer 2 located outside the third layer 3 is a substrate composite layer, a sixth layer 6 located outside the fifth layer 5 is another substrate composite layer, a first layer 1 located outside the second layer 2 is a cover layer, and a seventh layer 7 located outside the sixth layer 6 is a lining layer. The first layer, the second layer, the third layer, the fourth layer, the fifth layer, the sixth layer and the seventh layer are sequentially arranged in that order. The memory ironing-free foldable composite material that is composed of seven layers of materials as a whole structure, can be made into a finished product of apparel according to an apparel design scheme through ordinary tailoring and sewing by machine. There is no need to add an additional inner lining to support and shape the structure to achieve a shaping effect, and the shaping effect can be maintained after repeated folding and washing, would not foam and swell, would not delaminate by washing, would not peel off, can be rainproof and windproof, can have high humidity resistance and soft hand feeling, and thus can meet the needs of multi-scenarios and versatility. It can be folded and portable for apparels and bags. It can be pressed and folded without creases, thereby keeping appearance of its own fabric to be unchanged, washable without delamination, ironing-free, with memory function and easy to store. The silica gel itself will only be melt at 200~400° C., which can make the fabric have a better protective function and low logistics and transportation cost. After using the composite material, due to its soft and comfortable material characteristics, it can be applied to almost all materials and scenes. Moreover, the permeability of the silica gel can be retained or improved to make the fabric be windproof, waterproof and radiation-proof. Further, more and more extensive development and application can be done to enrich people's material and cultural lives.

Further, the silica gel layer adopts one of a silica gel mesh, a silica gel sheet and a silica gel roll and made of $SiO_2 \cdot nH_2O$ material ($SiO_2 \cdot nH_2O$, where n indicates the content of water molecules is not fixed), which can be adaptively selected according to specific requirements of design schemes and application occasions, such as specific requirements of weight, thickness, air permeability, rainproof, etc.

Because of adjustable softness and hardness of the silica gel ($SiO_2 \cdot nH_2O$, the silica gel sheet/the silica gel mesh/the silica gel foaming material and other materials mainly made of silica gel), it makes apparels have more imaginative space and suitable scenes (for example, its soft characteristic is suitable for children apparels and sports apparels), it has a good stability and a good affinity for fabrics. The use of the silica gel material can make the apparel products have functions of no creases after folding, memory and ironing-free, maintaining and improving the appearance of many soft fabrics. (e.g., suits/dresses/shirts/bags/shoes/hats), and restoring the shape quickly.

Specifically, the silica gel ($SiO_2 \cdot nH_2O$, the silica gel sheet/the silica gel mesh/the silica gel foaming material and other materials mainly made of silica gel) does not react with any substance except strong alkali and hydrofluoric acid, is insoluble in water and any solvent, is non-toxic and tasteless, and has stable chemical properties, thereby giving apparel products scientific and technological functions, making the apparels have functional extensions, and be windproof, waterproof, heatproof and radiation-proof, etc., and it does not change the softness of textiles, which can bring better use and better function in extreme scenario applications. Various types of silica gels ($SiO_2 \cdot nH_2O$, the silica gel sheet/the silica gel mesh/the silica gel foaming material and other materials mainly made of silica gel) can form different microporous structures due to different manufacturing methods. The chemical components and physical structure of silica gel ($SiO_2 \cdot nH_2O$, the silica gel sheet/the silica gel mesh/the silica gel foaming material and other materials mainly made of silica gel) determine that it has many characteristics difficult to be replaced by other similar materials such as high adsorption performance, good thermal stability, stable chemical properties, high mechanical strength, etc. Because of its diverse material properties and high-cost value, the application cost can be quickly reduced through the use of large volume, large area and multiple scenes in the scheme proposed by the disclosure.

Further, the cover layer can select a silicone oil release paper or an apparel fabric, that is, the fabric can be directly fixed, and the finished product of apparel can be formed by ordinary tailoring and sewing by machine; or a fabric combination can be arbitrarily selected through the silicone oil release paper, and then sewn through ordinary tailoring and sewing by machine to form the finished product of apparel.

Further, each of the substrate composite layers may be a polymer strong double-sided adhesive layer, or a combination material composed of the polymer strong double-sided adhesive layer and a substrate, and the substrate is a non-woven fabric.

Further, a material of each of the adhesion layers may adopt a surface treatment agent for silica gel, which is a combination material including a coupling agent, that is, a combination material composed of the coupling agent and other component(s).

Further, a material of the lining layer may be covered by a silicone oil release paper, or covered directly by an apparel lining. The lining material is an oxford lining or a non-woven fabric.

A manufacturing method of the memory ironing-free foldable composite material suitable for apparels according to the embodiment 1, may include the following steps:

step 1, performing roller-pressing for flattening and air-bubble removing on a roller-packed silica gel material or a sheet-packed silica gel material by using a large-scale roller-pressing composite mechanical equipment, an environment being required to be at a room temperature and dust-free during the flattening, and the material is flat and not curled after the flattening;

step 2, spraying a room temperature surface treatment adhesive agent on a surface of the roll-packed silica gel material or the sheet-packed silica gel material, and standing for five minutes after evenly spraying;

step 3, coating a layer of polymer strong double-sided adhesive layer evenly on an outer surface of the room temperature surface treatment adhesive agent by a roller-pressing method using a laminating machine or a spraying process using a spraying equipment, the silica gel material being needed to be fixed during the coating to avoid wrinkle;

step 4, covering a layer of release paper on an outer surface of the polymer strong double-sided adhesive layer to obtain a single-sided composite silica gel material; and step 5, turning over the single-sided composite silica gel material prepared in the step 4 to make an uncomposited side of the single-sided composite silica gel material face upward, and repeating the step 1 through the step 4 to obtain a finished product of the memory ironing-free foldable composite material of the embodiment 1.

Further, in the step 1, the roll-packed silica gel material is a thin silica gel, which can produce a roll of memory ironing-free foldable composite material suitable for apparels, and is convenient for large-area tailoring applications in a production process of apparels.

Further, the roller-pressing for flattening in the step 1 may be performed at a room temperature, which can meet requirements of composite properties; it can be performed at a temperature of 60~120° C. instead, and the shaping effect of the roller-pressing for flattening can be further improved by high-temperature heating.

Embodiment 2

Figure 2:
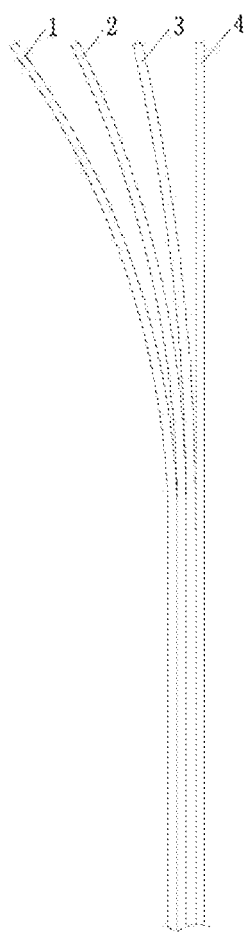
FIG. 2 is a schematic structural view of a memory ironing-free foldable composite material suitable for apparels according to embodiment 2 of the disclosure.

As shown in FIG. 2, based on the technical solution of the above embodiment 1, a memory ironing-free foldable composite material suitable for apparels of the embodiment 2 of the disclosure omits an inner layer structure and only includes four layers of materials, in which a fourth layer 4 located at a bottom-most position adopts a silica gel layer, a third layer 3 located on the silica gel layer adopts an adhesion layer, a second layer 2 located on the adhesion layer adopts a substrate composite layer, a first layer 1 located the substrate composite layer adopts a cover layer. The memory ironing-free foldable composite material suitable for apparels of the embodiment 2 has no lining. According to an apparel design scheme, the corresponding lining structure can be selected, or combined with other apparel materials into a multi-layer structure, and then the finished products of apparel can be formed by ordinary tailoring, sewing by machine and bonding process.

A manufacturing method of a memory ironing-free foldable composite material suitable for apparels of the embodiment 2, may include the following steps:
step 1, performing roller-pressing for flattening and air-bubble removing on a roll-packed silica gel material or a sheet-packed silica gel material by using a large-scale roller-pressing composite mechanical equipment, an environment being required to be at a room temperature and dust-free during the flattening, and the material is flat and not curled after the flattening;
step 2, spraying a room temperature surface treatment adhesive agent on a surface of the roll-packed silica gel material or the sheet-packed silica gel material, and standing for five minutes after evenly spraying;
step 3, coating a layer of polymer strong double-sided adhesive layer evenly on an outer surface of the room temperature surface treatment adhesive agent by a roller-pressing method using a laminating machine or a spraying process using a spraying equipment, the silica gel material being needed to be fixed during the coating to avoid wrinkle;
step 4, covering a layer of a release paper on an outer surface of the polymer strong double-sided adhesive layer to obtain a single-sided composite silica gel material; and thereby obtaining a finished product of the memory ironing-free foldable composite material suitable for apparels of the embodiment 2.

Further, in the step 1, the roll-packed silica gel material is a thin silica gel, which can produce a roll of memory ironing-free foldable composite material suitable for apparels, and is convenient for large-area tailoring applications in a production process of apparels.

Further, the roller-pressing for flattening in the step 1 may be performed at a room temperature, which can meet requirements of composite properties; it can be performed at a temperature of 60~120° C. instead, and the shaping effect of the roller-pressing for flattening can be further improved by high-temperature heating.

Embodiment 3

Figure 3A:
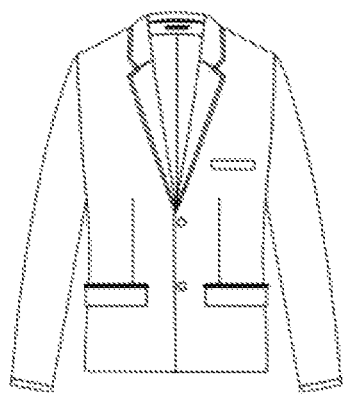
FIGS. 3A-3C are schematic structural views associated with a memory ironing-free foldable composite material suitable for apparels being applied to a suit according to embodiment 3 of the disclosure.
Figure 3B:
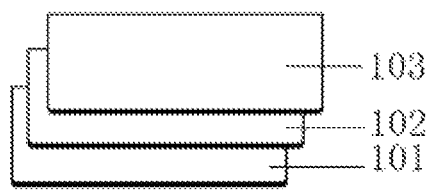
Figure 3C:
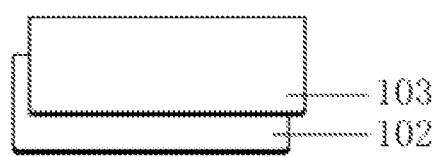

As shown in FIG. 3, the memory ironing-free foldable composite materials suitable for apparels of the above embodiment 1 and the above embodiment 2 in the disclosure are combined and applied in coat clothing such as suit, jacket or protective clothing (hereinafter referred to as coat clothing), which can be formed into the finished coat clothing as shown in FIG. 3A through ordinary tailoring, compounding, sewing by machine, shaping or bonding process according to an apparel design scheme. Alternatively, as shown in FIG. 3B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished coat clothing with three-layer material structure is sewn through ordinary tailoring, compounding, sewing, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 3C, the memory ironing-free foldable composite material 102 suitable for apparels can be directly used as the outermost layer and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished coat clothing with two-layer material structure is sewed through ordinary tailoring, compounding, sewing, shaping or bonding process. Alternatively, the collar, cuffs, shoulders, pockets and/or sleeves of the coat clothing that need crease-resistant, windproof, waterproof, anti-slip and/or anti-collision shall be set with a three-layer material structure and the memory ironing-free foldable composite material suitable for apparels shall be set as any one layer of the three-layer materials, and the other parts of the coat clothing shall be set with two-layer material structure or a single layer of the memory ironing-free foldable composite material suitable for apparels.

Embodiment 4

Figure 4A:
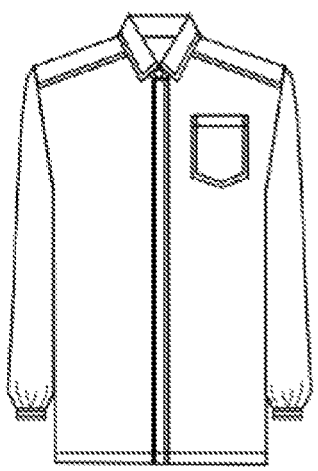
FIGS. 4A-4C are schematic structural views associated with a memory ironing-free foldable composite material suitable for apparels being applied to a shirt according to embodiment 4 of the disclosure.
Figure 4B:
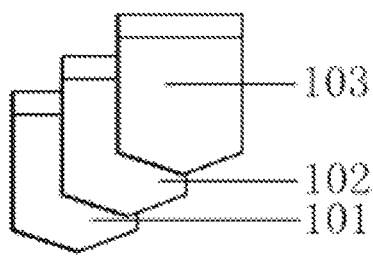
Figure 4C:
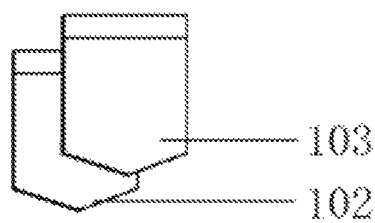

As shown in FIG. 4, the memory ironing-free foldable composite materials suitable for apparels of the above embodiment 1 and the above embodiment 2 in the disclosure are combined and applied in shirt as shown in FIG. 4A, which can be sewed to form the finished shirt through ordinary tailoring, compounding, sewing by machine, shaping or bonding process according to an apparel design scheme. Alternatively, as shown in FIG. 4B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished shirt with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 4C, the memory ironing-free foldable composite material 102 suitable for apparels can be directly used as the outermost layer, and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished shirt with two-layer material structure is sewed through ordinary tailoring, compounding, sewing by machine, shaping or bonding process. Alternatively, the collar, cuffs, shoulders, pockets and/or sleeves of the shirt that need crease-resistant, windproof, waterproof, anti-slip and/or anti-collision shall be set with three-layer material structure and the memory ironing-free foldable composite material suitable for apparels shall be set as any one layer of the three-layer materials, and the other parts of the shirt shall be set with two-layer material structure or a single layer of the memory ironing-free foldable composite material suitable for apparels.

Embodiment 5

Figure 5A:
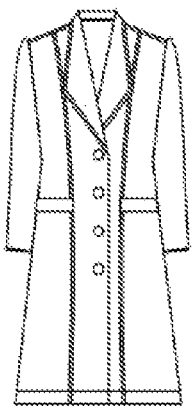
FIGS. 5A-5C are schematic structural views associated with a memory ironing-free foldable composite material suitable for apparels being applied to a windbreaker according to embodiment 5 of the disclosure.
Figure 5B:
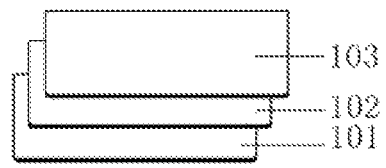
Figure 5C:
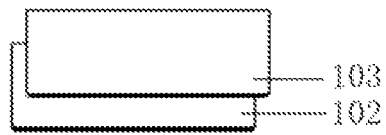

As shown in FIG. 5, the memory ironing-free foldable composite materials suitable for apparels of the above embodiment 1 and the above embodiment 2 in the disclosure are combined and applied in windbreaker as shown in FIG. 5A, which can be sewed to form the windbreaker finished product through ordinary tailoring, compounding, sewing by machine, shaping or bonding process according to an apparel design scheme. Alternatively, as shown in FIG. 5B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished windbreaker with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 5C, the memory ironing-free foldable composite material 102 suitable for apparels can be directly used as the outermost layer and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished windbreaker with two-layer material structure is sewed through ordinary tailoring, compounding, sewing by machine, shaping or bonding process. Alternatively, the collar, cuffs, shoulders, pockets and/or sleeves of the windbreaker that need crease-resistant, windproof, waterproof, anti-slip and/or anti-collision shall be set with three-layer material structure and the memory ironing-free foldable composite material suitable for apparels shall be set as any one layer of the three-layer materials, and the other parts of the windbreaker shall be set with two-layer material structure or a single layer of the memory ironing-free foldable composite material suitable for apparels.

Embodiment 6

Figure 6A:
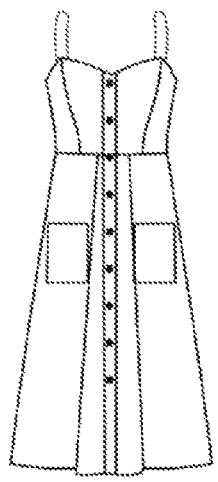
FIGS. 6A-6C are schematic structural views associated with a memory ironing-free foldable composite material suitable for apparels being applied to a one-piece dress according to embodiment 6 of the disclosure.
Figure 6B:
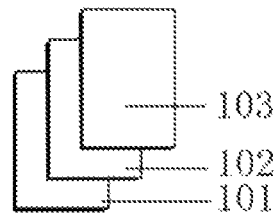
Figure 6C:
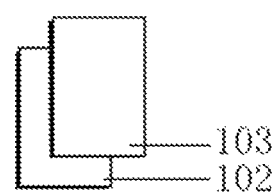

As shown in FIG. 6, the memory ironing-free foldable composite materials suitable for apparels of the above embodiment 1 and the above embodiment 2 in the disclosure are combined and applied in dress as shown in FIG. 6A, which can be sewed into the finished dress through ordinary tailoring, compounding, sewing by machine, shaping or bonding process according to an apparel design scheme. Alternatively, as shown in FIG. 6B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished dress with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 6C, the memory ironing-free foldable composite material 102 suitable for apparels can be directly used as the outermost layer and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished dress with two-layer material structure is sewed through ordinary tailoring, compounding, sewing by machine, shaping or bonding process. Alternatively, the collar, cuffs, shoulders, pockets and/or sleeves of the dress that need crease-resistant, windproof, waterproof, anti-slip and/or anti-collision shall be set with three-layer material structure and the memory ironing-free foldable composite material suitable for apparels shall be set as any one layer of the three-layer materials, and the other parts of the dress shall be set with two-layer material structure or a single layer of the memory ironing-free foldable composite material suitable for apparels.

Embodiment 7

Figure 7A:
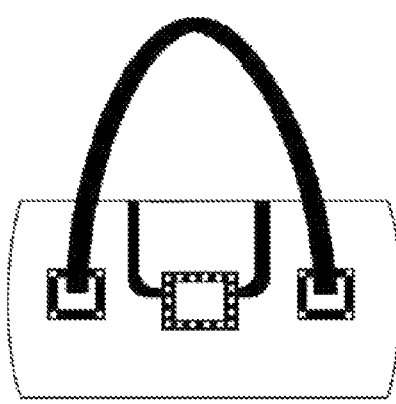
FIGS. 7A-7C are schematic structural views associated with a memory ironing-free foldable composite material suitable for apparels being applied to a handbag according to embodiment 7 the disclosure.
Figure 7B:
Figure 7C:

As shown in FIG. 7, the memory ironing-free foldable composite materials suitable for apparels of the above embodiment 1 and the above embodiment 2 in the disclosure are combined and applied in handbags, fashion bags or bags as shown in FIG. 7A, which can be sewn to form finished handbags, fashion bags or luggage through ordinary tailoring, compounding, sewing by machine, shaping or bonding process according to an apparel design scheme. Alternatively, as shown in FIG. 7B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished handbags, fashion bags or luggage with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 7C, the memory ironing-free foldable composite material 102 suitable for apparels can be directly used as the outermost layer and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished handbags, fashion bags or luggage with two-layer material structure is sewed through ordinary tailoring, compounding, sewing by machine, shaping or bonding process. Alternatively, the key friction parts such as wrist, bag front, back and/or button of handbags, fashion bags or luggage shall be set with a three-layer material structure, the memory ironing-free foldable composite material suitable for apparels shall be set as any one layer of the three-layer materials, and the other parts of the handbags, fashion bags or luggage shall be set with two-layer material structure or a single layer of the memory ironing-free foldable composite material suitable for apparels.

Embodiment 8

Figure 8A:
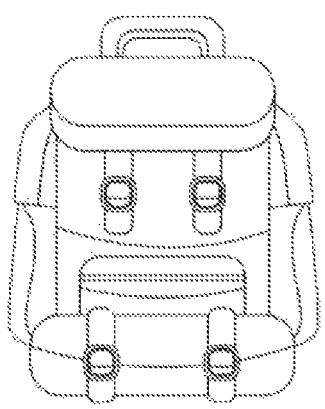
FIGS. 8A-8C are schematic structural views associated with a memory ironing-free foldable composite material suitable for apparels being applied to a backpack according to embodiment 8 of the disclosure.
Figure 8B:
Figure 8C:
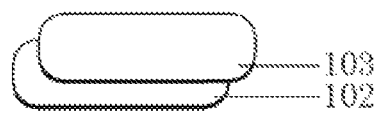

As shown in FIG. 8, the memory ironing-free foldable composite materials suitable for apparels of the above embodiment 1 and the above embodiment 2 in the disclosure are combined and applied in backpacks, shoulder bags or belt bags of the disclosure, which can be sewed to form the finished coat as shown in FIG. 8A through ordinary tailoring, compounding, sewing by machine, shaping or bonding process according to an apparel design scheme. Alternatively, as shown in FIG. 8B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished backpacks, shoulder bags or belt bags with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 8C, the memory ironing-free foldable composite material 102 suitable for apparels can be directly used as the outermost layer and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished backpacks, shoulder bags and belt bags with two-layer material structure is sewed through ordinary tailoring, compounding, sewing by machine, shaping or bonding process. Alternatively, the key friction parts such as wrist, bag front, back and/or button of backpacks, shoulder bags or belt bags shall be set with a three-layer material structure, the memory ironing-free foldable composite material suitable for apparels shall be set as any one layer of the three-layer materials, and the other parts of the backpacks, shoulder bags or belt bags shall be set with two-layer material structure or a single layer of the memory ironing-free foldable composite material suitable for apparels.

Embodiment 9

Figure 9A:
FIGS. 9A-9C are schematic structural views associated with a memory ironing-free foldable composite material suitable for apparels being applied to a shoe according to embodiment 9 of the disclosure.
Figure 9B:
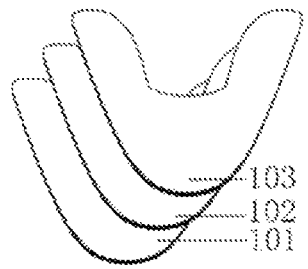
Figure 9C:
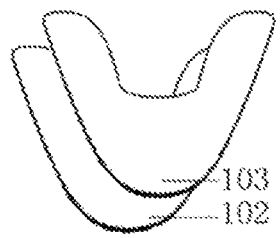

As shown in FIG. 9, the memory ironing-free foldable composite materials suitable for apparels of the above embodiment 1 and the above embodiment 2 in the disclosure is applied in footwear such as sports shoes, casual shoes and boots, snow shoes and boots, leather shoes and boots, polar shoes and boots, especially canvas shoes, as shown FIG. 9A, which can be sewn to form finished footwear through ordinary tailoring, compounding, sewing by machine, shaping or bonding process according to an apparel design scheme. Alternatively, as shown in FIG. 9B, according to a specific application design scheme and cost control, a layer of lining 103 is arranged inside the memory ironing-free foldable composite material 102 suitable for apparels, and a layer of fabric 101 is arranged outside the memory ironing-free foldable composite material 102 suitable for apparels, the finished footwear with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, as shown in FIG. 9C, the memory ironing-free foldable composite material 102 suitable for apparels can be directly used as the outermost layer and a layer of lining 103 can be arranged inside the memory ironing-free foldable composite material 102 suitable for apparels, or the memory ironing-free foldable composite material 102 suitable for apparels can be directly used as the innermost layer and a layer of fabric 101 is arranged outside the memory ironing-free foldable composite material suitable for apparels, and the finished footwear with two-layer material structure is sewed through ordinary tailoring, compounding, sewing by machine, shaping or bonding process. Alternatively, the key friction parts such as upper, shoe body and/or insole of the footwear shall be set with a three-layer material structure, the memory ironing-free foldable composite material suitable for apparels shall be set as any one layer of the three-layer materials, and the other parts of the footwear shall be set with two-layer material structure or a single layer of the memory ironing-free foldable composite material suitable for apparels.

Embodiment 10

The disclosure applies the memory ironing-free foldable composite materials suitable for apparels of the above embodiment 1 and the above embodiment 2 in the disclosure are combined and applied in brassiere, which can be sewed to form the finished brassiere through ordinary tailoring, compounding, sewing by machine, shaping or bonding process according to the brassiere design scheme. Alternatively, according to a specific application design scheme and cost control, a layer of lining is arranged inside the memory ironing-free foldable composite material suitable for apparels, and a layer of fabric is arranged outside the memory ironing-free foldable composite material suitable for apparels, the finished brassiere with three-layer material structure is sewn through ordinary tailoring, compounding, sewing by machine, shaping or bonding process, or the memory ironing-free foldable composite material suitable for apparels can also be directly arranged on the outermost of the three-layer material structure as the fabric, or directly arranged on the innermost as the lining. According to the specific application design scheme and the cost control, the memory ironing-free foldable composite material suitable for apparels can be directly used as the outermost layer and a layer of lining can be arranged inside the memory ironing-free foldable composite material suitable for apparels, or the memory ironing-free foldable composite material suitable for apparels can be directly used as the innermost layer and a layer of fabric is arranged outside the memory ironing-free foldable composite material suitable for apparels, and the finished brassiere with two-layer material structure is sewed through ordinary tailoring, compounding, sewing by machine, shaping or bonding process. Alternatively, the key friction parts such as middle layer, inner layer and/or cup cover of the brassiere shall be set with a three-layer material structure, the memory ironing-free foldable composite material suitable for apparels shall be set as any one layer of the three-layer materials, and the other parts of the brassiere shall be set with two-layer material structure or a single layer of the memory ironing-free foldable composite material suitable for apparels.

The disclosure discloses a new technology auxiliary support material with memory, ironing-free and no crease. Through an inspection of the material, the scope of application includes all cotton, wool, linen, polyester, silk, genuine leather, synthetic fiber, artificial leather and synthetic material used to support and shape all apparels, bags and shoes. The material of the disclosure uses thin silica gel ($SiO_2 \cdot nH_2O$, the silica gel sheet/the silica gel mesh/the silica gel foaming material and other materials mainly made of silica gel) as an intermediate support layer. According to use scenario, the top surface and the bottom surface of the support layer uses a strong double-sided adhesive layer+a treatment agent to connect the other layers respectively or a single surface of the support layer uses the strong double-sided adhesive layer+the treatment agent to connect the other layers, and an adhesive technology is used to compound silica gel ($SiO_2 \cdot nH_2O$, the silica gel sheet/the silica gel mesh/the silica gel foaming material and other materials mainly made of silica gel) transfer excellent characteristics of the silica gel ($SiO_2 \cdot nH_2O$, the silica gel sheet/the silica gel mesh/the silica gel foaming material and other materials mainly made of silica gel) to a broader apparel life scene.

Through process of the disclosure, the apparels have the function of extensions, and be windproof, waterproof, heatproof and radiation-proof, etc., and it does not change softness of the textile, which can bring better use and better function in extreme scenario applications.

Silica gel ($SiO_2 \cdot nH_2O$, the silica gel sheet/the silica gel mesh/the silica gel foaming material and other materials mainly made of silica gel) has excellent physical and chemical properties such as inertia, stability, folding resistance, no crease, wind proofing and rain proofing.

The current process in the related art is applied to products with small area and small model, which are widely used, but the processing is limited, the main scene is missing, and the cost is high, making it difficult to enter a routine life application.

Silica gel ($SiO_2 \cdot nH_2O$, the silica gel sheet/the silica gel mesh/the silica gel foaming material and other materials mainly made of silica gel) is used as the main material of the composite material, which is not conducive to direct processing and application because of its inertia and high stability/softness.

With progress of times, traditional apparel industry needs more and more new technologies, new materials and new processes to improve and enhance the scenario application. Most apparels need to be shaped, so the washing method is limited, and dry cleaning must be used. The cost and space occupation of logistics and storage increased. Moreover, some scenes also need to be rainproof, windproof and have high humidity resistant. Traditional fabrics basically only have general functions such as warmth preservation, which cannot meet people's ever-changing pursuit.

In the processes of developing new materials and using new processes, it is found that silica gel materials are widely used. In China's huge industrial clusters, the basic application of silica gel has reached the world-class level. In the trial production of new products, problems are found and solutions are found one by one, and all problems can be solved.

After trial production and marketing of one of the single cap products, it has received a high market response (97% of high praise) after a period of inspection. In line with intellectual property protection, sustainable product development, and long-term mass production and application, etc., more applications and protections of the composite material and solution are required. Therefore, inventor invests time, energy and capital, etc. to put forward the composite material and scheme of the disclosure.

At present, through a small number of trial production samples, theoretical communication and cost accounting with major brand customers, it is found that the composite sheet and solution of the disclosure have broad market space and economic benefits. Therefore, in practical application, multi-functional composite apparel materials and processes with silica gel as a main body, foldable memory, no crease, ironing-free, wind proofing, water proofing and super sense would be continued to try to be manufactured and explored.

Preferably, a manufacturing method that can be achieved by the current technology is selected, on a side of roller-packed thin silica gel, a large-scale roller-pressing composite mechanical equipment is used, and the silica gel materials are flattened;
  a preferred room temperature surface treatment adhesive agent is sprayed on a surface of one side of flattened silica gel material;
  then a polymer strong double-sided adhesive layer is coated evenly on an outer side of one side of silica gel sprayed with the surface treatment agent, and there shall be no wrinkles in a whole production;
  an outer side of polymer strong double-sided adhesive layer is covered with a silicone oil release paper to thereby complete a single-sided treatment process;
  the single-sided silica gel material that has completed a single-sided composite adhesive is turned over to the other side, flattening without creases; a surface of the other side of the silica gel material is also sprayed with the surface treatment adhesive agent;

then the polymer strong double-sided adhesive layer is coated evenly on an outer side of the single-sided silica gel material sprayed with the surface treatment agent; and an outer side of the polymer strong double-sided adhesive layer is covered with another silicone oil release paper to thereby complete another single-sided treatment process.

After the above steps are processed, a core of the disclosure i.e., silica gel composite material is formed. After a long time and countless times of matching, the preferred materials are processed at room temperature, and can also be heated to 60~120° C., roller-pressed, flattened and shaped.

The polymer strong double-sided adhesive layer is composed of a substrate (non-woven fabric) and an adhesive.

The embodiments of the disclosure may mainly have the following advantages.

1. Combined with world's largest and most mature silica gel basic technology in China, silica gel will be used in a large area, change an idea of cost, expand applications and gradually reduce a production cost.
2. Based on a basic application research of conventional polymer adhesive materials mastered by the current manufacturing industry, the development of polymer adhesive and composite technology in China can be improved through extensive and in-depth use.
3. It can be proficiently and widely used in China's light industry manufacturing industry by using processes such as using adhesive, silica gel processing, tailoring and cutting, compounding, sewing by machine, so as to realize cross material, cross industry, process innovation and integrated application.
4. In view of deficiencies of the existing apparel fabrics and accessories, regular scale application, small area anti-slip and anti-collision, isolation gasket, small volume, small area, lack of large market main body application, a large number of application scenes are provided, which can make the silica gel material more widely used in production and life. The ironing-free foldable material with a memory performance is folded and portable, folded/overlapped without creases, keeps the appearance of its own fabric to be unchanged, washable, ironing-free, with memory function, can retain be windproof and rainproof, and has anti-penetration and other functions. After using the material, due to its soft and comfortable material characteristics, the apparel category has portability, pressure resistance and folding resistance, arbitrary washing, thereby changing the inconvenient places of conventional apparel products in all application environments. The overall quality of the materials can be improved by using silica gel ($SiO_2 \cdot nH_2O$, the silica gel sheet/the silica gel mesh/the silica gel foaming material and other materials mainly made of silica gel) and adhesive technology, which can effectively solve the problem of lack of function of existing application materials.

The disclosure is not limited to the above-described optional embodiments. Anyone can obtain various other forms of products under the enlightenment/inspiration of the disclosure. However, regardless of any change in its shape or structure, any technical solution falling within the scope of the claims of the disclosure falls within the protection scope of the disclosure.

What is claimed is:

1. A memory ironing-free foldable composite material suitable for apparels, comprising: at least seven layers of materials;

wherein a fourth layer as a middle layer is a silica gel layer, a third layer and a fifth layer respectively adjacent to two opposite sides of the middle layer are adhesion layers, a second layer located outside the third layer is a substrate composite layer, a sixth layer located outside the fifth layer is another substrate composite layer, a first layer located outside the second layer is a cover layer, and a seventh layer located outside the sixth layer is a lining layer;

wherein the first layer, the second layer, the third layer, the fourth layer, the fifth layer, the sixth layer and the seventh layer are sequentially arranged in that order and directly connected with each other;

wherein the silica gel layer is one selected from the group consisting of a silica gel mesh, a silica gel sheet and a silica gel roll and made of a $SiO_2 \cdot nH_2O$ material;

wherein the cover layer is a non-stick paper, and the non-stick paper is a silicone oil release paper;

wherein each of the sixth layer and the second layer comprises a polymer double-sided adhesive layer;

wherein a material of each of the adhesion layers is a surface treatment agent for silica gel, and the surface treatment agent for silica gel is a combination material comprising a coupling agent; and wherein a material of the lining layer is a non-stick paper, and the non-stick paper is a silicone oil release paper.

2. The memory ironing-free foldable composite material according to claim 1, wherein the memory ironing-free foldable composite material is applied between an apparel fabric and an apparel lining to obtain a multi-layer structure, and a finished product of apparel is formed by a tailoring and sewing by machine on the multi-layer structure according to an apparel design scheme; or wherein a surface of the memory ironing-free foldable composite material is directly covered with a layer of apparel fabric to obtain a multi-layer structure, and a finished product of apparel is formed by a tailoring and sewing by machine on the multi-layer structure according to an apparel design scheme.

3. A memory ironing-free foldable composite material suitable for apparels, comprising:

a cover layer, being a silicone oil release paper or an apparel fabric;

a first substrate composite layer, in direct contact with the cover layer, wherein the first substrate composite layer is a polymer double-sided adhesive layer;

a first adhesion layer, in direct contact with a surface of the first substrate composite layer facing away from the cover layer, wherein the first adhesion layer is made of a surface treatment agent for silica gel;

a silica gel layer, in direct contact with a surface of the first adhesion layer facing away from the first substrate composite layer;

a second adhesion layer, in direct contact with a surface of the silica gel layer facing away from the first adhesion layer, wherein a material of the second adhesion layer is the same as that of the first adhesion layer;

a second substrate composite layer, in direct contact with a surface of the second adhesion layer facing away from the silica gel layer, wherein a material of the second substrate composite layer is the same as that of the first substrate composite layer; and a lining layer, in contact with a surface of the second substrate composite layer facing away from the second adhesion layer, wherein the lining layer is a silicone oil release paper.

* * * * *